United States Patent [19]

Wu

[11] Patent Number: 5,702,216
[45] Date of Patent: Dec. 30, 1997

[54] EXPANDING WALL PLUG

[76] Inventor: Ming-Hsin Wu, 14 Fl., No. 494, Sec. 2, Hsin-Chin Rd., Hsin Ying City, Tainan Hsien, Taiwan

[21] Appl. No.: 703,886

[22] Filed: Aug. 27, 1996

[51] Int. Cl.$^6$ ............................. F16B 13/04; F16B 13/06
[52] U.S. Cl. .................................. 411/32; 411/51; 411/60
[58] Field of Search ........................ 411/32, 33, 49, 411/50, 51, 55, 60, 61, 72, 73

[56] References Cited

U.S. PATENT DOCUMENTS

| | | | |
|---|---|---|---|
| 1,278,025 | 9/1918 | Salmons | 411/32 |
| 1,470,423 | 10/1923 | Brady | 411/51 |
| 3,181,414 | 5/1965 | Dickow | 411/72 X |
| 4,770,581 | 9/1988 | Limbrick | 411/50 |
| 4,854,793 | 8/1989 | Ollivier et al. | 411/55 X |

FOREIGN PATENT DOCUMENTS

| | | | |
|---|---|---|---|
| 3502607 | 7/1986 | Germany | 411/60 |
| 254174 | 5/1949 | Switzerland | 411/55 |

*Primary Examiner*—Neill R. Wilson
*Attorney, Agent, or Firm*—Bacon & Thomas

[57] ABSTRACT

An expanding wall plug including a headed anchoring socket adapted for mounting in a hole in a wall; a screw inserted through the anchoring socket and having a head received in a tapered hole at one end of the anchoring socket, an expansion shell mounted around the screw and abutted against the anchoring socket, having two wedge blocks and an outer thread or ribs at two opposite ends for anchoring, and two opposite longitudinal slots at one end, and a conical tightening up device mounted around the screw rod and forced forwards to squeeze the locating expansion shell against the anchoring socket axially upon rotary motion of the screw rod, the conical tightening up device having two wedge blocks symmetrically raised from the periphery and respectively forced into the longitudinal slots of the locating expansion shell.

4 Claims, 6 Drawing Sheets

1

EXPANDING WALL PLUG

BACKGROUND OF THE INVENTION (a) Field of the Invention

The present invention relates to expanding wall plugs, and relates more particularly to such an expanding wall plug which is mounted with an anchoring socket that absorbs shearing force.

(b) Description of the Prior Art

Regular expanding wall plugs are commonly comprised of a screw rod, an expansion shell, and a tightening up device. The screw rod is inserted through the expansion shell. The tightening up device is threaded onto the screw rod. When installed in a hole in a wall, the tightening up device is forced forward to squeeze the expansion shell against the head of the screw rod upon rotary motion of the screw rod, causing the expansion shell to expand and to fix to the inside of the hole in the wall. This structure of expanding wall plug cannot be positively anchored in a wall of soft material structure. Regular expanding wall plugs have different sizes for fastening to walls of different depths. Therefore, different expanding wall plugs must be used for different conditions. Furthermore, regular expanding wall plugs are designed to protect against tension force. However, because shearing force is concentrated at the screw rod, the screw rod tends to be damaged.

SUMMARY OF THE INVENTION

The present invention provides an expanding wall plug which eliminates the aforesaid drawbacks. According to one embodiment of the present invention, the expanding wall plug comprises a headed anchoring socket adapted for mounting in a hole in a wall, a screw inserted through the anchoring socket and having a head received in a tapered hole at one end of the anchoring socket, an expansion shell mounted around the screw and abutted against the anchoring socket, the shell having two wedge blocks and an outer thread or plurality of circumferential ribs at two opposite ends for anchoring, and two opposite longitudinal slots at one end, and a conical tightening up device mounted around the screw rod and forced forwards to squeeze the locating expansion shell against the anchoring socket axially upon rotary motion of the screw rod, the conical tightening up device having two wedge blocks symmetrically raised from the periphery and respectively forced into the longitudinal slots of the locating expansion shell. According to an alternate form of the present invention, the screw rod has a plain rod section at one end connected to the head. This alternate form is practical for installation in a hollow wall, or spaced walls.

DETAILED DESCRIPTION OF THE PREFERRED EMBODIMENT

Figure 1:
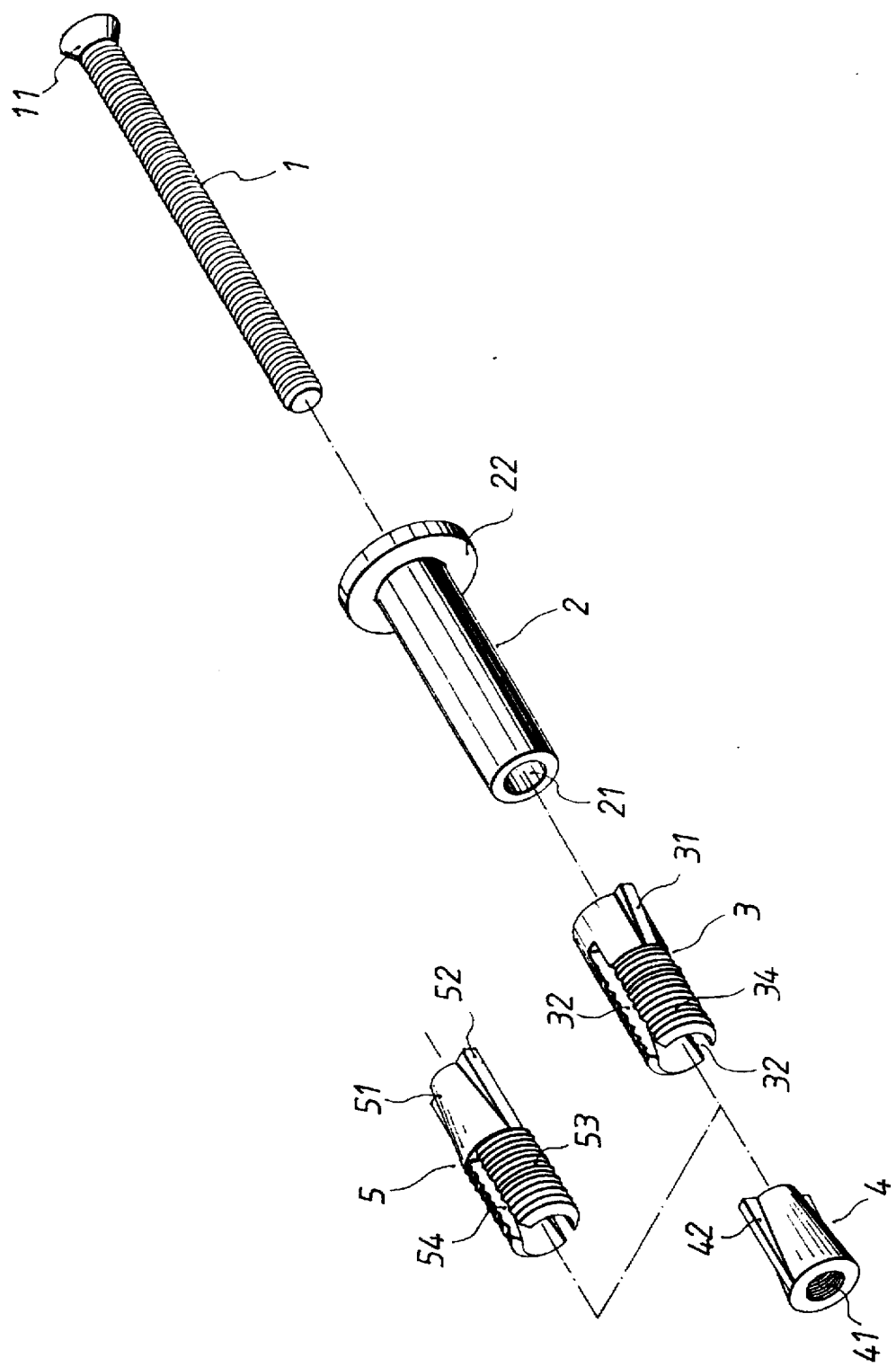
FIG. 1 is an exploded perspective view of an expanding wall plug according to a first embodiment of the present invention.

Referring to FIG. 1, an expanding wall plug in accordance with a first embodiment of the present invention is generally comprised of a screw rod 1, an anchoring socket 2, a locating expansion shell 3, a tightening up device 4, and an expansion tension shell 5.

The screw rod 1 has a head 11 at one end. The anchoring socket 2 is made from metal and adapted for mounting in a hole in a wall, having an outward flange 22 extending around one end and a longitudinal through hole 21. The longitudinal through hole 21 has one end flared outwardly so that the head 11 of the screw 1 can be completely received in the longitudinal through hole 21. The locating expansion shell 3 is a hollow shell molded from plastic, comprising two wedge blocks 31 symmetrically raised from the periphery at one end, an outer threaded or a plurality of circumferential ribs 34 at an opposite end, and two opposite longitudinal slots 32 cut through the outer thread or ribs 34 and extending to one end. The wedge blocks 31 and the longitudinal slots 32 are equiangularly spaced around the periphery of the locating expansion shell 3. The tightening up device 4 is a conical member having a screw hole 41 through the longitudinal central axis, and two wedge blocks 42 symmetrically raised from the periphery. The expansion tension shell 5 comprises a tapered coupling portion 51 at one end, two wedge blocks 52 symmetrically raised from the tapered coupling portion 51 at two opposite sides, an outer thread or a plurality or circumferential ribs 53 at an opposite end, and two opposite longitudinal slots 54 cut through the ribs 53 and extending to one end. The wedge blocks 52 and the longitudinal slots 54 are equiangularly spaced around the periphery of the expansion tension shell 5.

Figure 4:
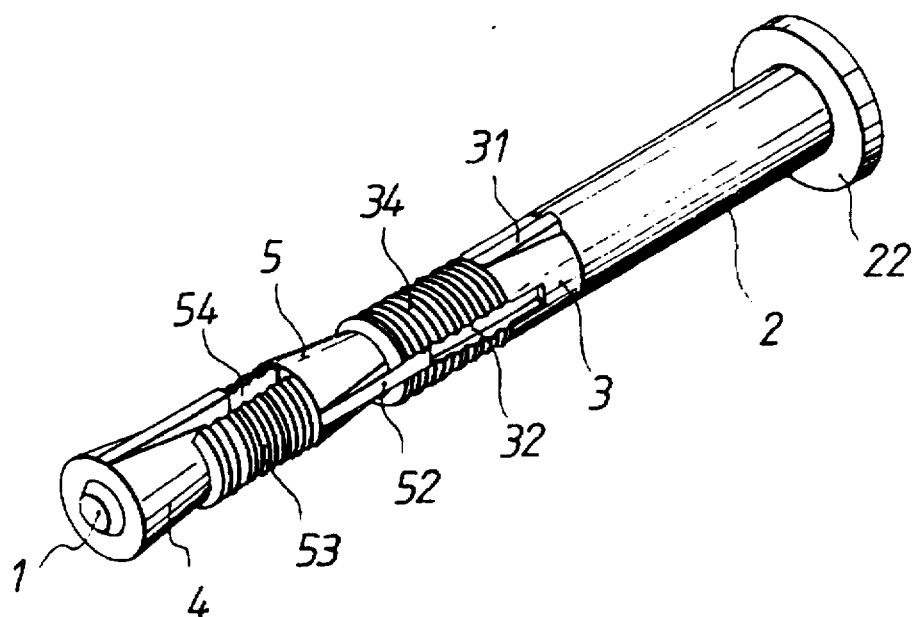
FIG. 4 is a perspective view of the first embodiment of the present invention (the expansion tension shell included)
Figure 5:
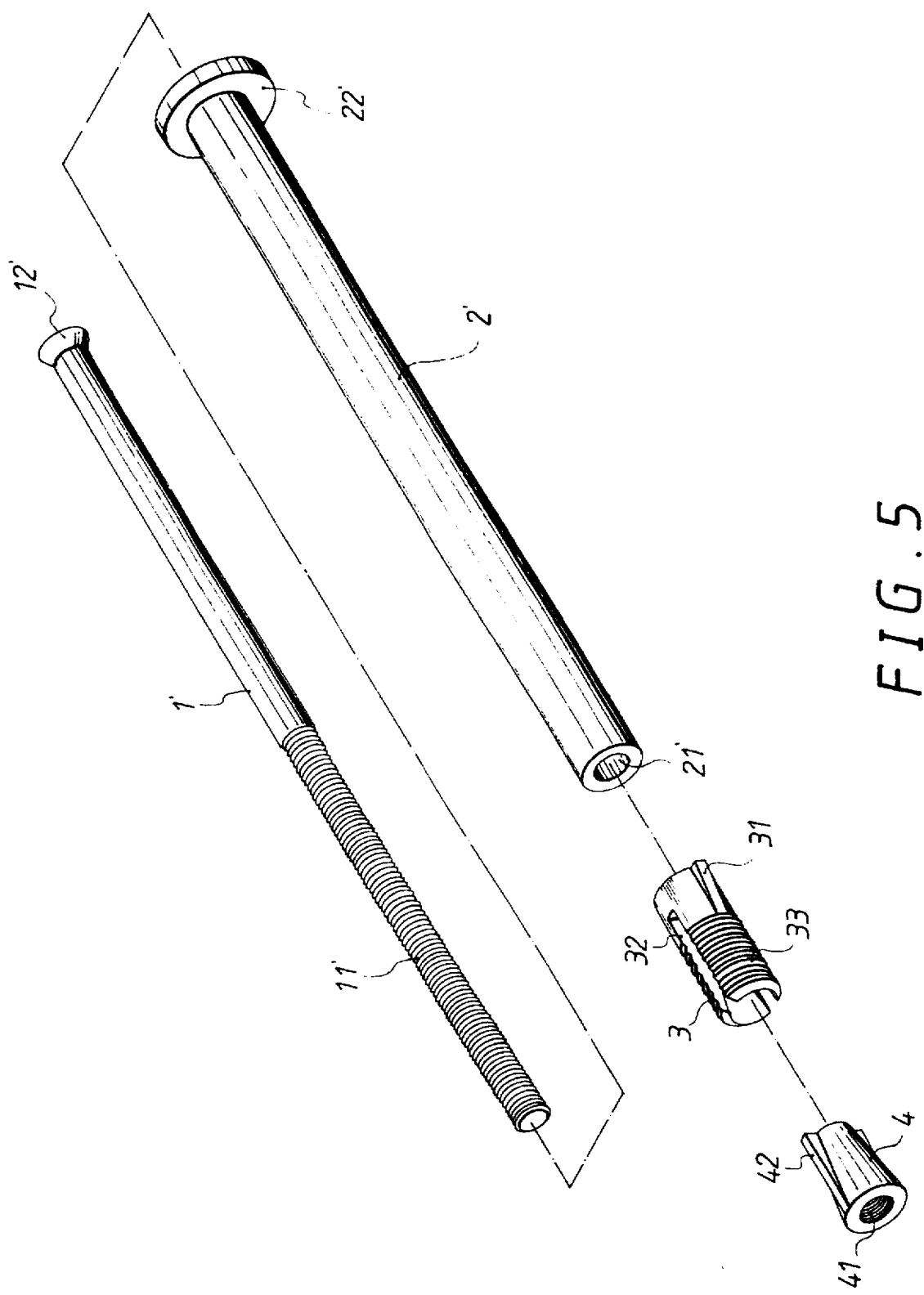
FIG. 5 is an exploded perspective view of an expanding wall plug according to a second embodiment of the present invention.

Referring to FIG. 4, the screw rod 1 is inserted in proper order through the anchoring socket 2, the locating expansion shell 3, and the expansion tension shell 5, and then threaded into the tightening up device 4, permitting the wedge blocks 42 of the tightening up device 4 to be respectively forced into the longitudinal slots 54 of the expansion tension shell 5 and the wedge blocks 52 of the expansion tension shell 5 into the longitudinal slots 32 of the locating expansion shell 3.

Figure 3:
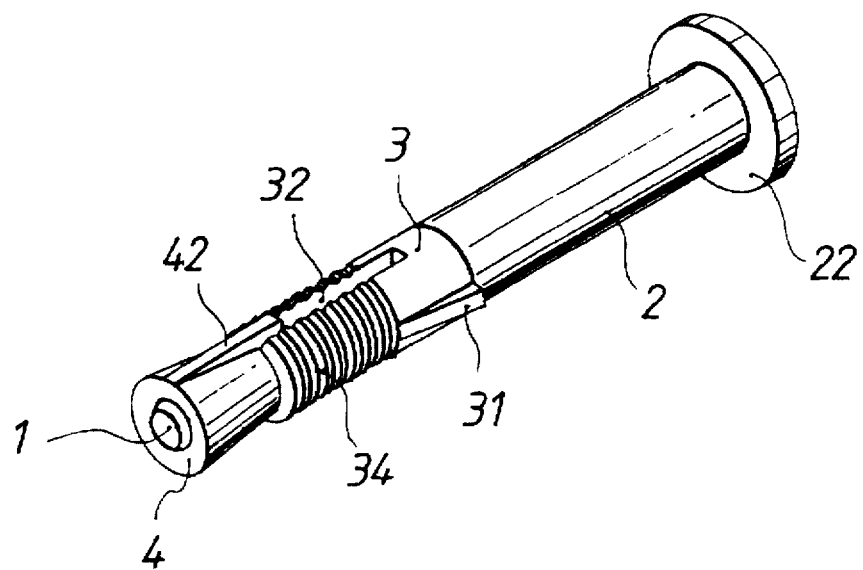
FIG. 3 is a perspective view of the first embodiment of present invention (the expansion tension shell excluded)

As an alternative arrangement, the expansion tension shell 5 may be eliminated, permitting the wedge blocks 42 of the tightening up device 4 to be respectively forced into the longitudinal slots 32 of the locating expansion shell 3, as shown in FIG. 3.

Figure 2:
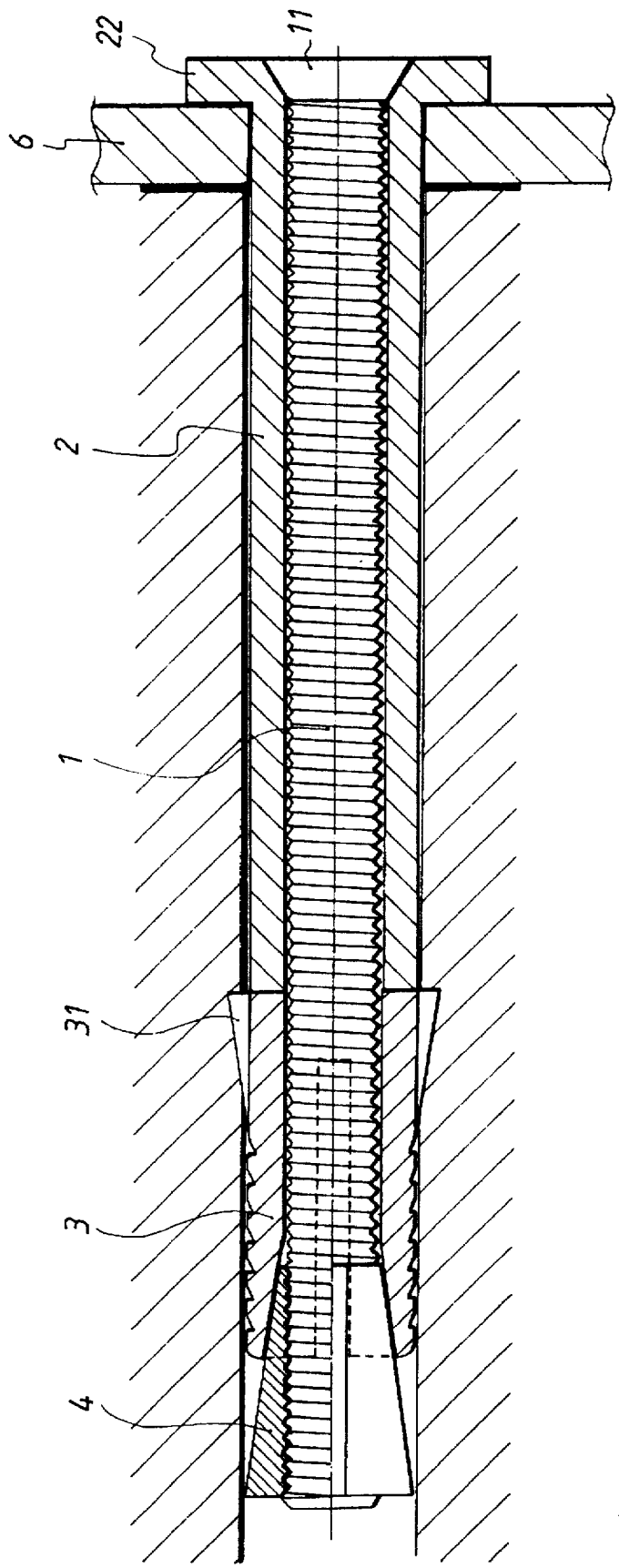
FIG. 2 is a sectional view of an installed example of the first embodiment of the present invention (the expansion tension shell excluded)

Referring to FIG. 2, when the expanding wall plug is inserted into a hole in the workpiece 6 and a hole in the wall, the outward flange 22 of the anchoring socket 2 is stopped outside the workpiece 6, and the head 11 of the screw rod 1 is received in the anchoring socket 2 in flush with the outward flange 22. When the screw rod 1 is turned, the tightening up device 4 is forced against and squeeze the locating expansion shell 3, causing the locating expansion shell 3 to expand and secure itself to the inside surface of the wall hole. Because the screw rod 1 is embedded in the anchoring socket 2, shearing force is completely absorbed by the anchoring socket 2. Therefore, the screw rod 1 does not bear any shearing force.

Figure 6:
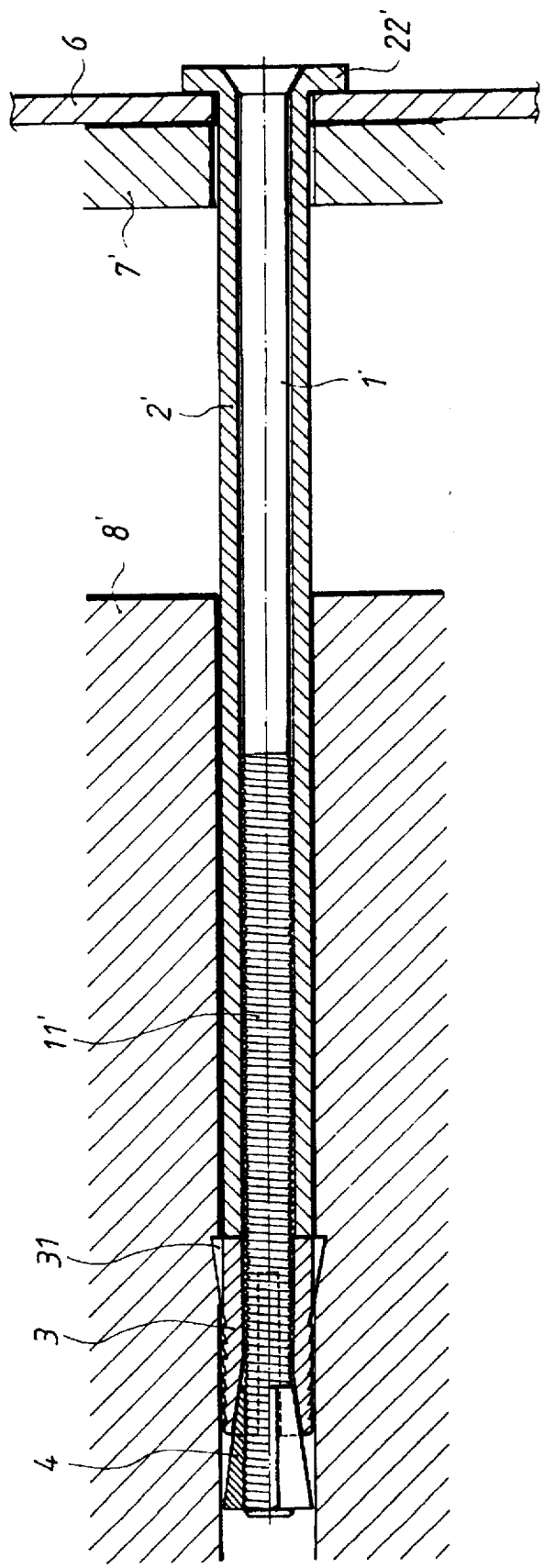
FIG. 6 is a sectional view of an installed example of the second embodiment of the present invention.
Figure 7:
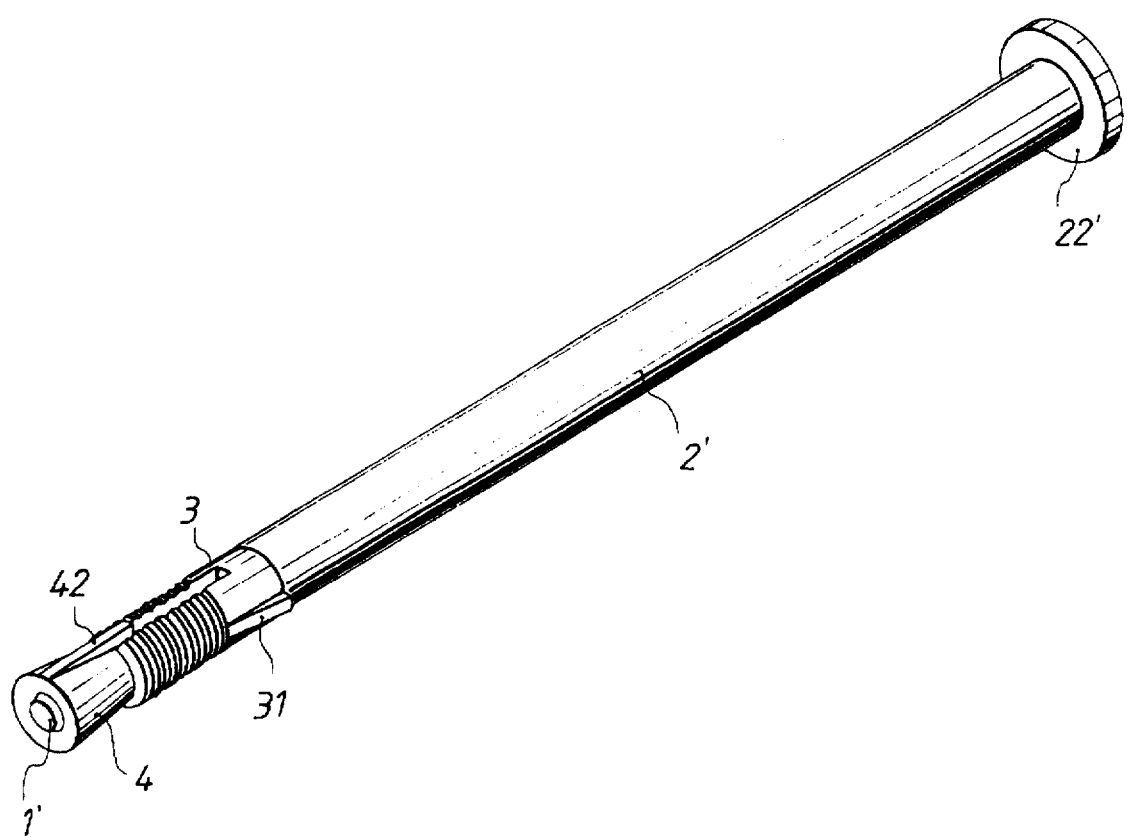
FIG. 7 is a perspective view of the second embodiment of the present invention.

FIGS. from 5 to 7 show an expansion wall plug according to a second embodiment of the present invention. According to this alternate form, the expansion wall plug is comprised of a screw rod 1', an anchoring socket 2', a locating expansion shell 3, and a tightening up device 4. The locating expansion shell 3 and the tightening up device 4 are identical to that of the aforesaid first embodiment of the present invention. The anchoring socket 2' is similar to the anchoring socket 2 of the first embodiment of the present invention, having an outward flange 22' at one end, and a longitudinal through hole 21'. However, the anchoring socket 2' of the second embodiment of the present invention is relatively longer than the anchoring socket 2 of the first embodiment of the present invention. The screw 1' has an outer thread 11' around the periphery of the front half, and a head 12' at one end of the plain second half remote from the outer thread 11'. This expanding wall plug is practical for fastening a workpiece 6' to two spaced walls 7', 8' (see FIG. 6). Before installation, the screw rod 1' is inserted through the anchoring socket 2' and the locating expansion shell 3, and threaded into the screw hole 41 of the tightening up device 4, permitting the wedge blocks 42 of the tightening up device 4 to be forced into the longitudinal slots 32 of the locating expansion shell 3. When installed, as shown in FIG. 6, the screw 2' is rotated to force the tightening up device 4 forwards, thereby causing the locating expansion shell 3 to be forced by the tightening up device 4 to expand. Because the screw 1' is embedded in the anchoring socket 2', it is free from the effect of shearing force.

It is to be understood that the drawings are designed for purposes of illustration only, and are not intended as a definition of the limits and scope of the invention disclosed.

What the invention disclosed is:

1. An expanding wall plug comprising:

an anchoring socket made from metal and adapted for mounting in a hole in a wall, the socket having an outward flange raised around one end thereof, and a longitudinal through hole, said longitudinal through hole having a tapered outer end gradually increasing toward the outside;

a screw inserted through said anchoring socket, the screw having a head received in the tapered outer end of the longitudinal through hole of said anchoring socket;

a locating expansion shell sleeved onto said screw and abutted against one end of said anchoring socket, said expansion shell comprising two wedge blocks symmetrically raised from the periphery at one end, a plurality of circumferential ribs at an opposite end, and two opposite longitudinal slots cut through the ribs and extending to one end, the wedge blocks and longitudinal slots of said expansion shell being equiangularly spaced around the periphery; and a conical tightening up device mounted around said screw rod and forced forwards to squeeze said locating expansion shell against said anchoring socket axially upon rotary motion of said screw rod, said conical tightening up device having a screw hole threaded onto said screw rod, and two wedge blocks symmetrically raised from the periphery and respectively forced into the longitudinal slots of said locating expansion shell.

2. An expanding wall plug comprising:

an anchoring socket made from metal and adapted for mounting in a hole in a wall, having an outward flange raised around one end thereof, and a longitudinal through hole, said longitudinal through hole having a tapered outer end gradually increasing toward the outside;

a screw inserted through said anchoring socket, the screw having a head received in the tapered outer end of the longitudinal through hole of said anchoring socket;

a locating expansion shell sleeved onto said screw and abutted against one end of said anchoring socket, said expansion shell comprising two wedge blocks symmetrically raised from the periphery at one end, a plurality of circumferential ribs at an opposite end, and two opposite longitudinal slots cut through the ribs and extending to one end, the wedge blocks and longitudinal slots of said expansion shell being equiangularly spaced around the periphery;

an expansion tension shell mounted around said screw rod and connected to said locating expansion shell, said expansion tension shell comprising a tapered coupling portion at one end inserted into one end of said locating expansion shell, two wedge blocks symmetrically raised from said tapered coupling portion and respectively forced into the longitudinal slots of said locating expansion shell, a plurality of circumferential ribs at an opposite end, and the opposite longitudinal slots cut through the ribs of said expansion tension shell and extending to one end, the wedge blocks and the longitudinal slots of said expansion tension shell being equiangularly spaced around the periphery; and a conical tightening up device mounted around said screw rod and forced forwards to squeeze said expansion tension shell and said locating expansion shell against said anchoring socket axially upon rotary motion of said screw rod, said conical tightening up device having a screw hole threaded onto said screw rod, and two wedge blocks symmetrically raised from the periphery and respectively forced into the longitudinal slots of said expansion tension shell.

3. The expanding wall plug of claim 1 wherein said screw rod has a plain rod section at one end connected to the head.

4. The expanding wall plug of claim 2 wherein said screw rod has a plain rod section at one end connected to the head.

* * * * *